US012027827B2

(12) United States Patent
Gozawa

(10) Patent No.: US 12,027,827 B2
(45) Date of Patent: Jul. 2, 2024

(54) SPARK PLUG

(71) Applicant: NGK SPARK PLUG CO., LTD, Nagoya (JP)

(72) Inventor: Tatsuya Gozawa, Nagoya (JP)

(73) Assignee: NGK SPARK PLUG., LTD., Aichi (JP)

( * ) Notice: Subject to any disclaimer, the term of this patent is extended or adjusted under 35 U.S.C. 154(b) by 0 days.

(21) Appl. No.: 17/915,303

(22) PCT Filed: Nov. 16, 2020

(86) PCT No.: PCT/JP2020/042565
§ 371 (c)(1),
(2) Date: Sep. 28, 2022

(87) PCT Pub. No.: WO2021/229844
PCT Pub. Date: Nov. 18, 2021

(65) Prior Publication Data

US 2023/0143447 A1 May 11, 2023

(30) Foreign Application Priority Data

May 13, 2020 (JP) ................................ 2020-084290

(51) Int. Cl.
*H01T 13/32* (2006.01)
*H01T 13/54* (2006.01)
*H01T 21/02* (2006.01)

(52) U.S. Cl.
CPC ............ *H01T 13/32* (2013.01); *H01T 13/54* (2013.01); *H01T 21/02* (2013.01)

(58) Field of Classification Search
CPC ......... H01T 13/32; H01T 13/54; H01T 21/02; H01T 13/20
See application file for complete search history.

(56) References Cited

U.S. PATENT DOCUMENTS 10,714,906 B1 * 7/2020 Ban ......................... H01T 13/54
10,777,976 B1 * 9/2020 Gozawa .................. H01T 13/32
(Continued)

FOREIGN PATENT DOCUMENTS

JP 2003-257581 A 9/2003
JP 2016-122618 A 7/2016
(Continued)

OTHER PUBLICATIONS

International Preliminary Report on Patentability (English translation) dated Nov. 15, 2022 from corresponding International PCT Patent Application No. PCT/JP20/42565.
(Continued)

*Primary Examiner* — Zheng Song
*Assistant Examiner* — Glenn D Zimmerman
(74) *Attorney, Agent, or Firm* — KUSNER & JAFFE

(57) ABSTRACT

A spark plug includes a metallic shell which holds a center electrode in an insulated condition, and a ground electrode is held in a penetration hole of the metallic shell. The penetration hole includes a circular counterbore portion, and a penetrating portion extending from the counterbore portion to an inner circumferential surface of the metallic shell. The ground electrode includes a fixing portion which is fixed to the counterbore portion, and an extension portion extending from the fixing portion. The extension portion has a flat surface which faces a forward end surface of the center electrode in the axial direction. The penetrating portion restricts the extension portion such that the flat surface of the extension portion faces toward a rear end side in the axial direction.

7 Claims, 7 Drawing Sheets

(56) References Cited

U.S. PATENT DOCUMENTS

| | | | | |
|---|---|---|---|---|
| 2003/0181121 | A1 | 9/2003 | Matsubara et al. | |
| 2012/0242215 | A1* | 9/2012 | Hwang | H01T 13/54 313/143 |
| 2012/0299459 | A1* | 11/2012 | Sakakura | H01T 13/54 445/3 |
| 2020/0295540 | A1* | 9/2020 | Ban | H01T 13/54 |
| 2020/0335949 | A1* | 10/2020 | Gozawa | H01T 13/39 |
| 2020/0358260 | A1* | 11/2020 | Gozawa | H01T 13/20 |
| 2021/0399532 | A1* | 12/2021 | Ban | H01T 13/54 |

FOREIGN PATENT DOCUMENTS

| | | | | |
|---|---|---|---|---|
| JP | 2019-046660 | A | 3/2019 | |
| JP | 6566637 | B2 * | 8/2019 | |
| JP | 2020-021600 | A | 2/2020 | |
| JP | 6899409 | B2 * | 7/2021 | H01T 13/06 |
| WO | WO-2022264891 | A1 * | 12/2022 | |

OTHER PUBLICATIONS

International Search Report from corresponding International Patent Application No. PCT/JP20/42565, dated Jan. 26, 2021.

* cited by examiner

SPARK PLUG

FIELD OF INVENTION

The present invention relates to a spark plug having a spark gap between a center electrode and a ground electrode.

BACKGROUND OF INVENTION

Japanese Patent Application Laid-Open (kokai) No. 2019-46660 (FIG. 5) discloses a technique for a spark plug which includes a center electrode, a metallic shell holding the center electrode in an insulated condition, and a ground electrode connected to the metallic shell. According to the technique, a first end portion of a circular columnar ground electrode is held in a penetration hole provided in the metallic shell, a side surface of a second end portion of the ground electrode faces a forward end surface of the center electrode, and the gap between the side surface of the second end portion and the forward end surface of the center electrode is used as a spark gap.

However, the above-described technique has the following problem. Since the side surface of the ground electrode which faces the forward end surface of the center electrode via the spark gap is a cylindrical surface, the side surface of the ground electrode may be consumed easily due to discharge, and the spark gap may expand at an early stage of usage. A conceivable measure for solving the problem is, for example, to form a quadrangular penetration hole in the metallic shell and press-fit a ground electrode having the shape of a quadrangular prism into the quadrangular penetration hole. When such a structure is employed, the above-mentioned problem can be solved, because the side surface of the ground electrode facing the forward end surface of the center electrode can be made flat. However, in reality, it is extremely difficult to machine in particular the penetration hole in such a manner that corners of the penetration hole coincide with the shape of the ground electrode.

SUMMARY OF INVENTION

The present invention has been accomplished so as to solve the above-mentioned problem, and an object of the present invention is to provide a spark plug which can reduce consumption of the ground electrode while facilitating machining of the penetration hole.

In order to achieve the object, a spark plug of the present invention comprises a center electrode extending in a direction of an axial line; a tubular metallic shell which holds the center electrode in an insulated condition and which has a penetration hole penetrating the metallic shell in a thickness direction; and a ground electrode which extends in a direction intersecting the direction of the axial line (hereinafter referred to as the axial direction) and which has a first end portion held in the penetration hole, and a second end portion located on a forward end side of the center electrode in the axial direction such that a spark gap is provided between the second end portion and a forward end surface of the center electrode. The penetration hole includes a circular counterbore portion formed on an outer circumferential side of the metallic shell, and a penetrating portion extending from the counterbore portion to an inner circumferential surface of the metallic shell. The ground electrode includes a circular plate-shaped fixing portion which is fixed to the counterbore portion, and an extension portion extending from one surface of the fixing portion to a position which faces the forward end surface of the center electrode in the axial direction. A flat surface which faces the forward end surface of the center electrode in the axial direction is provided on a side surface of the extension portion. The penetrating portion restricts the extension portion such that the flat surface of the extension portion faces toward a rear end side in the axial direction.

According to a first mode, the penetration hole penetrating the metallic shell in the thickness direction includes the circular counterbore portion provided on the outer circumferential side of the metallic shell, and the penetrating portion extending from the counterbore portion to the inner circumferential surface of the metallic shell. The circular plate-shaped fixing portion of the ground electrode is fixed to the counterbore portion, and the extension portion extending from the fixing portion faces the forward end surface of the center electrode in the direction of the axial line. Since the counterbore portion to which the fixing portion of the ground electrode is fixed is circular, machining of the penetration hole can be facilitated. The penetrating portion restricts the extension portion such that the flat surface provided on the side of the extension portion faces toward the rear end side in the axial direction, and the spark gap is provided between the flat surface of the extension portion and the forward end surface of the center electrode. Therefore, consumption of the ground electrode due to discharge can be reduced as compared with the case where the side surface of the ground electrode is a cylindrical surface. Therefore, it is possible to prevent expansion of the spark gap at an early stage of usage.

According to a second mode, the penetrating portion restricts the orientation of the extension portion such that the angle between the axial line and a plane perpendicular to the flat surface of the extension portion becomes smaller than 90 degrees. By virtue of this configuration, an effect similar to that of the first mode can be yielded.

According to a third mode, the penetrating portion restricts the orientation of the extension portion such that the angle between the axial line and the plane perpendicular to the flat surface of the extension portion becomes equal to or smaller than 45 degrees. Since a discharge point (position where discharge occurs) becomes likely to be located on the flat surface of the extension portion, in addition to the effect of the first mode, an effect of reliably enhancing the spark consumption resistance of the ground electrode can be yielded.

According to a fourth mode, the penetrating portion restricts the orientation of the extension portion such that the angle between the axial line and the plane perpendicular to the flat surface of the extension portion becomes equal to or smaller than 5 degrees. Since the discharge point becomes more likely to be located on the flat surface of the extension portion, in addition to the effect of the first mode, an effect of more reliably enhancing the spark consumption resistance of the ground electrode can be yielded.

According to a fifth mode, the penetrating portion includes a flat surface provided on the rear end side. Since the ground electrode can be disposed in such a manner that the flat surface of the extension portion faces the flat surface of the penetrating portion, in addition to the effect of any one of the first through fourth modes, an effect of simplifying the shape of the extension portion can be yielded.

According to a sixth mode, the penetration hole has a recess which is larger in diameter than the counterbore portion and is located on the outer circumferential side of the metallic shell in relation to the counterbore portion. Therefore, in addition to the effect of any one of the first through fifth modes, the following effect can be yielded. Even when the length of the fixing portion of the ground electrode is greater than the depth of the counterbore portion, since the recess is present, the fixing portion is unlikely to project outward from the metallic shell.

According to a seventh mode, the metallic shell is a tubular body having a closed bottom on a forward end side in the axial direction. A jetting hole which differs from the penetration hole and penetrates the metallic shell in the thickness direction is provided in the metallic shell. Although the extension portion of the ground electrode located on the inner side of the metallic shell having the shape of a bottomed tube is disposed in an environment in which the extension portion is easily heated and is easily consumed, application of the present invention yields an effect of reducing the consumption of the extension portion of the ground electrode, in addition to the effect of any one of the first through sixth modes.

DETAILED DESCRIPTION OF INVENTION

Figure 1:
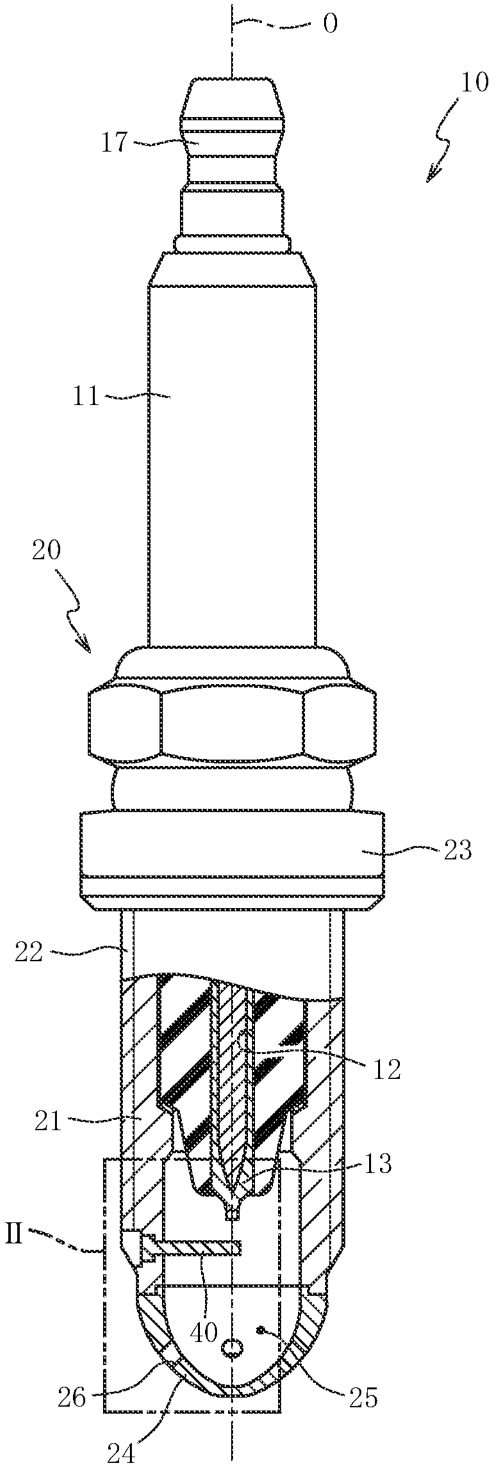
FIG. 1 is a partial sectional view of a spark plug in a first embodiment.

Preferred embodiments of the present invention will now be described with reference to the attached drawings. FIG. 1 is a partial sectional view of a spark plug 10 in a first embodiment. In FIG. 1, the lower side of the sheet will be referred to as the forward end side of the spark plug 10, and the upper side of the sheet will be referred to as the rear end side of the spark plug 10 (this also applies to FIG. 2 and FIG. 4). FIG. 1 shows a cross section of a forward-end-side portion of the spark plug 10, the cross section containing an axial line O. As shown in FIG. 1, the spark plug 10 includes an insulator 11, a center electrode 13, a metallic shell 20, and a ground electrode 40.

The insulator 11 is an approximately cylindrical tubular member having an axial hole 12 formed therein and extending along the axial line O. The insulator 11 is formed of a ceramic material, such as alumina, which is excellent in mechanical characteristics and insulating performance at high temperatures. The center electrode 13 is disposed in the axial hole 12 of the insulator 11.

Figure 2:
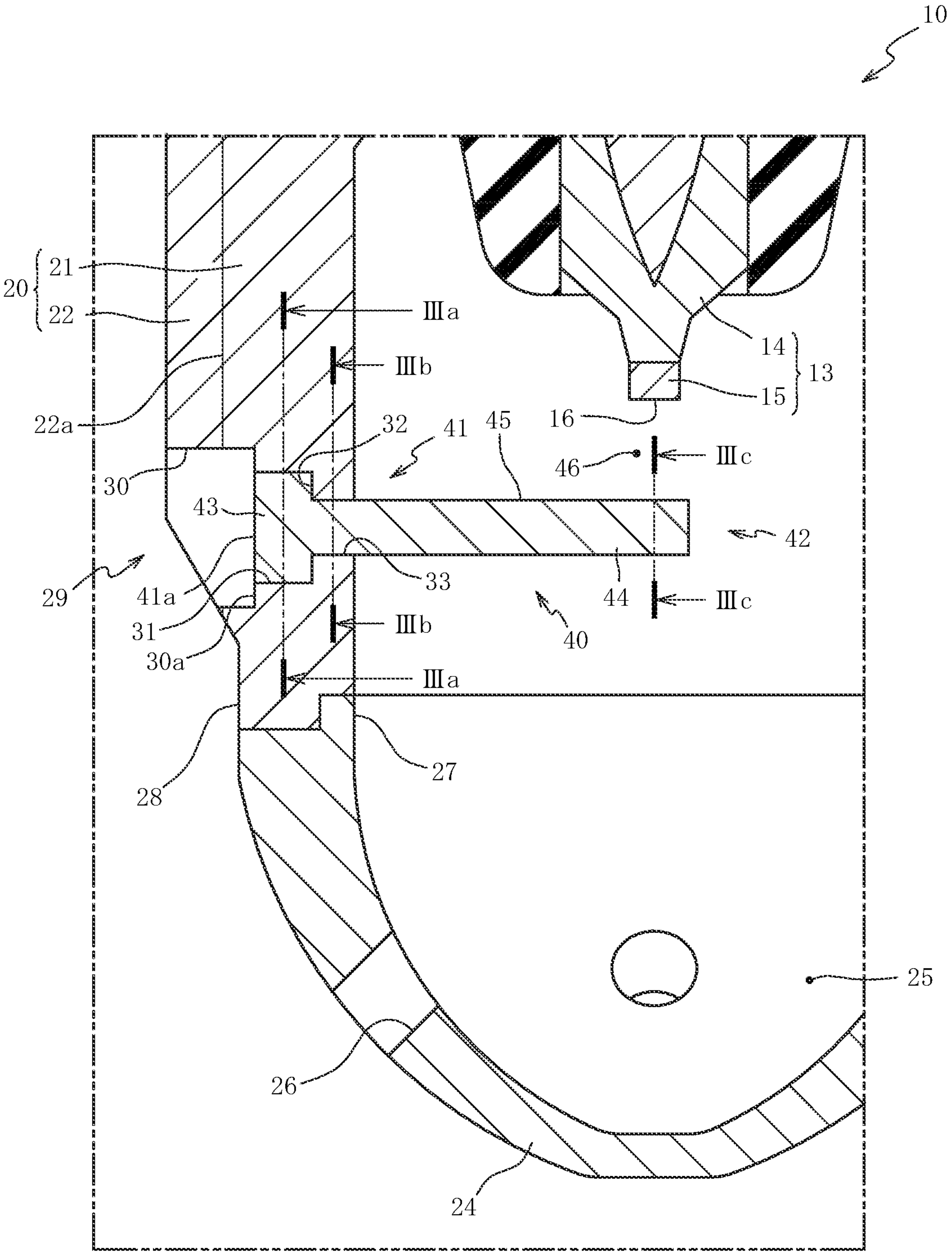
FIG. 2 is a sectional view of the spark plug showing, on an enlarged scale, a portion of FIG. 1 indicated by II.

FIG. 2 is a sectional view of the spark plug 10, the sectional view containing the axial line O and showing, on an enlarged scale, a portion of FIG. 1 indicated by II. The center electrode 13 is a rod-shaped member having electrical conductivity. The center electrode 13 includes a base member 14 in which a core having high thermal conductivity is embedded, and a disk-shaped discharge member 15 joined to the base member 14. The base member 14 is formed of Ni or an alloy containing Ni as a main component. The core is formed of Cu or an alloy containing Cu as a main component. The core may be omitted. The discharge member 15 is formed of, for example, a noble metal, such as Pt, Ir, Ru, or Rh, which is higher in resistance to consumption caused by spark (hereinafter referred to as "spark consumption resistance") than the base member 14, W, or an alloy whose main component is a noble metal or W.

Referring back to FIG. 1, the center electrode 13 is electrically connected to a metallic terminal member 17 within the axial hole 12. The metallic terminal member 17 is a rod-shaped member to which a high voltage cable (not shown) is connected. The metallic terminal member 17 is formed of an electrically conductive metallic material (for example, low carbon steel). The metallic terminal member 17 is fixed to the rear end of the insulator 11.

The metallic shell 20 is a bottomed tubular member and formed of an electrically conductive metallic material (for example, low carbon steel). The metallic shell 20 includes a cylindrical tubular portion 21 having a male screw 22 formed on an outer circumferential surface of the cylindrical tubular portion 21, and a bearing portion 23 located adjacent to and on the rear end side of the cylindrical tubular portion 21.

The male screw 22 of the cylindrical tubular portion 21 is brought into thread engagement with a threaded hole of an engine (not shown). The outer diameter of the bearing portion 23 is larger than the outer diameter of the male screw 22. The bearing portion 23 bears an axial force produced when the male screw 22 is screwed into the threaded hole of the engine. The metallic shell 20 holds the insulator 11 from the outer circumferential side.

A bottom portion 24 is connected to a part of the cylindrical tubular portion 21 of the metallic shell 20, which part is located on the forward end side of the male screw 22. The bottom portion 24 is a member having a hemispherical shape or the shape of a bottomed cylindrical tube. The bottom portion 24 is formed of, for example, a metallic material which contains, as a main component(s), one or more metals selected from Fe, Ni, Cu, etc. The bottom portion 24 is substantially a portion of the metallic shell 20. Since the cylindrical tubular portion 21 is closed by the bottom portion 24, the metallic shell 20 is a close-bottomed tubular body. In the present embodiment, the bottom portion 24 is a hemispherical member and is joined to the cylindrical tubular portion 21 by a weld portion (not shown).

A sub-chamber 25 is defined and surrounded by the cylindrical tubular portion 21 and the bottom portion 24. A jetting hole 26 penetrating the bottom portion 24 in the thickness direction thereof is formed in the bottom portion 24. The jetting hole 26 establishes communication between the sub-chamber 25 and a combustion chamber of the engine (not shown). In the present embodiment, a plurality of jetting holes 26 are formed in the metallic shell 20. The ground electrode 40 is connected to the metallic shell 20. The ground electrode 40 is a rod-shaped member formed of, for example, a metallic material which contains, as a main component(s), one or more metals selected from Pt, Ni, Ir, etc.

As shown in FIG. 2, the metallic shell 20 has a penetration hole 29 formed to extend from an inner circumferential surface 27 of the metallic shell 20 to an outer circumferential surface 28 of the metallic shell 20. In the present embodiment, the penetration hole 29 is formed in the cylindrical tubular portion 21 of the metallic shell 20 to be located at a position corresponding to the male screw 22. The penetration hole 29 has a recess 30, a counterbore portion 31, and a penetrating portion 33, which are provided in this sequence from the outer circumferential surface 28 toward the inner circumferential surface 27 of the metallic shell 20.

The recess 30 has a circular cross section. The recess 30 has a depth greater than the depth of the groove 22*a* of the male screw 22. The bottom 30*a* of the recess 30 is an annular flat surface. The counterbore portion 31 is a bottomed cylindrical surface connected to the bottom 30*a* of the recess 30. The counterbore portion 31 has a diameter smaller than the diameter of the bottom 30*a* of the recess 30. The penetrating portion 33 extends from the bottom 32 of the counterbore portion 31 to the inner circumferential surface 27 of the metallic shell 20. The penetrating portion 33 has a cross-sectional area smaller than the cross-sectional area of the counterbore portion 31.

The ground electrode 40 is formed linearly and extends in a direction intersecting the axial direction (in the present embodiment, the ground electrode 40 extends approximately perpendicularly to the axial line O). The ground electrode 40 has a rod-like shape and has a first end portion 41 held in the penetration hole 29 and a second end portion 42 located on the inner side of the metallic shell 20. The first end portion 41 of the ground electrode 40 is held in the penetration hole 29 of the metallic shell 20. The first end portion 41 is joined to the metallic shell 20 by a weld portion (not shown). An end surface 41*a* of the first end portion 41 of the ground electrode 40 and the bottom 30*a* of the recess 30 are located on the same plane.

The second end portion 42 of the ground electrode 40 is located on the forward end side of the forward end surface 16 of the center electrode 13. The forward end surface 16 of the center electrode 13 is the same as the forward end surface of the discharge member 15. The forward end surface 16 has an approximately circular shape.

The ground electrode 40 has a fixing portion 43 fixed to the counterbore portion 31, and an extension portion 44 extending from the fixing portion 43 beyond the inner circumferential surface 27 of the metallic shell 20. An end portion of the extension portion 44 is the same as the second end portion 42 of the ground electrode 40. The side surface of the extension portion 44 includes a flat surface 45. The flat surface 45 faces toward the rear end side in the axial direction. The flat surface 45 faces the forward end surface 16 of the center electrode 13, whereby a spark gap 46 extending in the axial direction is formed.

Figure 3:
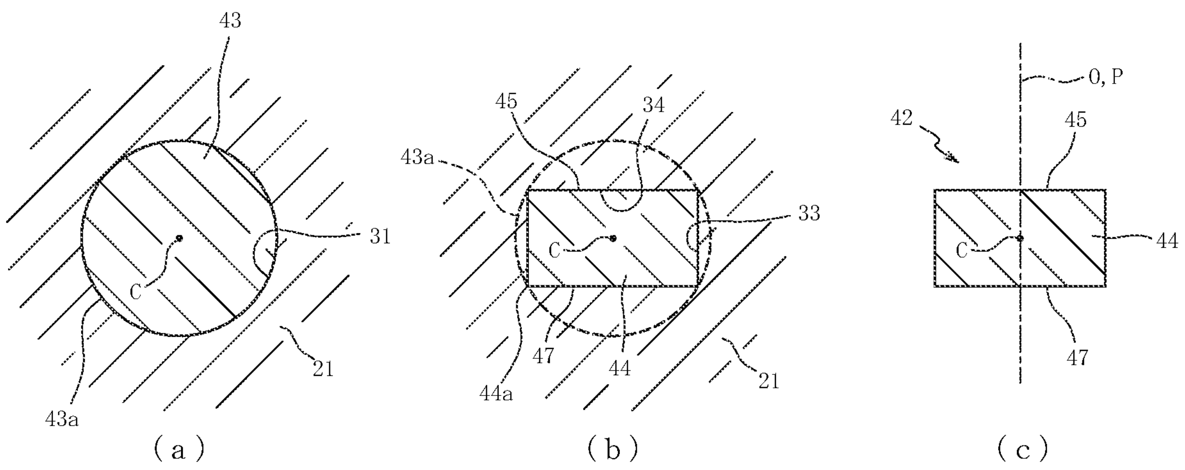
FIG. 3, Section (a) is a sectional view of the spark plug taken along line IIIa-IIIa of FIG. 2, FIG. 3, Section (b) is a sectional view of the spark plug taken along line IIIb-IIIb of FIG. 2, and FIG. 3, Section (c) is a sectional view of the spark plug taken along line IIIc-IIIc of FIG. 2.

Section (a) of FIG. 3 is a sectional view of the spark plug 10 taken along line IIIa-IIIa of FIG. 2. The counterbore portion 31 of the penetration hole 29 has a circular cross section. The fixing portion 43 of the ground electrode 40 has the shape of a circular plate (circular column) having a circular cross section and is fitted into the counterbore portion 31. The fixing portion 43 has rotational symmetry about an axis C which passes through the center of the cross section of the fixing portion 43 and is perpendicular to the axial line O. Since the counterbore portion 31, to which the circular plate-shaped fixing portion 43 is fixed, has a circular shape, machining of the penetration hole 29 can be facilitated.

Section (b) of FIG. 3 is a sectional view of the spark plug 10 taken along line IIIb-IIIb of FIG. 2. The extension portion 44 is partially fitted into the penetrating portion 33 of the penetration hole 29. In the present embodiment, the penetrating portion 33 has a rectangular cross section having a width greater than its height, and a flat surface 34 is provided at the rear end. The flat surface 34 faces toward the forward end side. In the present embodiment, the flat surface 34 is perpendicular to the axial line O. The cross section of the penetrating portion 33 has 2-fold symmetry about the axis C; i.e., a cross section obtained by rotating 180 degrees the original cross section about the axis C perfectly overlaps the original cross section.

In the present embodiment, the extension portion 44 of the ground electrode 40 has a rectangular cross section having a width greater than its height. The flat surface 45 of the extension portion 44 faces the flat surface 34 of the penetrating portion 33. The extension portion 44 has a size determined such that four corners 44*a* of the cross section of the extension portion 44 are in contact with the outline 43*a* of the cross section of the fixing portion 43. Notably, the cross section of the penetrating portion 33 differs from the cross section of the extension portion 44 in at least one of size and shape. In the present embodiment, although the shape of the cross section of the penetrating portion 33 is approximately the same as the shape of the cross section of the extension portion 44, the cross section of the penetrating portion 33 is slightly larger than the cross section of the extension portion 44.

The outline 43*a* of the cross section of the fixing portion 43 refers to the outline of the cross section of a region of the fixing portion 43 where the weld portion (not shown) is not formed. This is for the following reason. Since the fixing portion 43 has been melted into the weld portion, in a region of the fixing portion 43 where the weld portion is formed, the outline 43*a* of the original cross section of the fixing portion 43 cannot be determined.

Section (c) of FIG. 3 is a sectional view of the spark plug 10 taken along line IIIc-IIIc of FIG. 2 and containing the axial line O. The size and shape of the cross section of the extension portion 44 at the second end portion 42 of the ground electrode 40 (see section (c) of FIG. 3) are identical to those of the cross section of the extension portion 44 at the first end portion 41 of the ground electrode 40 (see section (b) of FIG. 3). Since the extension portion 44 of the ground electrode 40 has the shape of a quadrangular prism, a flat surface 47 whose size is the same as the flat surface 45 is provided on the side opposite the flat surface 45. The cross section of the extension portion 44 has 2-fold symmetry about the axis C which passes through the center of the cross section of the fixing portion 43 (see section (a) of FIG. 3) and is perpendicular to the axial line O; i.e., a cross section obtained by rotating 180 degrees the original cross section about the axis C perfectly overlaps the original cross section.

In a process of manufacturing the spark plug 10, the ground electrode 40 is inserted into the penetration hole 29 of the metallic shell 20 in such a manner that the second end portion 42 of the extension portion 44 is first inserted into the penetration hole 29, the first end portion 41 of the extension portion 44 is then fitted into the penetrating portion 33, and the fixing portion 43 is then fitted into the counterbore portion 31. Accordingly, the upper limit of the cross-sectional area of the second end portion 42 is equal to the cross-sectional area of the penetrating portion 33. In the case where the fit between the extension portion 44 of the ground electrode 40 and the penetrating portion 33 of the penetration hole 29 is set to interference fit (press-fit structure), the cross-sectional area of the second end portion 42 becomes approximately equal to the area of the penetrating portion 33. Notably, the fit between the extension portion 44 of the ground electrode 40 and the penetrating portion 33 may be loose fit or transition fit. In the case where the fit between the extension portion 44 and the penetrating portion 33 is loose fit or transition fit, machining of the extension portion 44 and the penetrating portion 33 can be facilitated.

Also, the extension portion 44 has a size determined such that four corners 44*a* of the cross section of the extension portion 44 are in contact with the outline 43*a* of the cross section of the fixing portion 43 (see section (a) of FIG. 3). Therefore, the greater the diameter of the outline 43*a* of the fixing portion 43, the greater the degree to which the cross-sectional area of the extension portion 44 can be increased. In the case where the fit between the fixing portion 43 of the ground electrode 40 and the counterbore portion 31 is set to interference fit (press-fit structure), the cross-sectional area of the fixing portion 43 becomes approximately equal to the area of the counterbore portion 31. Since the fixing portion 43 has a circular plate-like shape, the fit between the fixing portion 43 and the counterbore portion 31 whose cross section is circular can be easily set to interference fit. Notably, the fit between the fixing portion 43 of the ground electrode 40 and the counterbore portion 31 may be loose fit or transition fit.

After the first end portion 41 of the ground electrode 40 has been fitted into the penetration hole 29, the fixing portion 43 is welded to the metallic shell 20. Since both the counterbore portion 31 and the fixing portion 43 have circular outer shapes, it is easy to secure the fit between the counterbore portion 31 and the fixing portion 43. The weld portion (not shown) where the fixing portion 43 and the metallic shell 20 melt into each other is provided over the entire circumference of the fixing portion 43 in order to secure gastightness. The weld portion extends from the bottom 30*a* of the recess 30 in the thickness direction of the metallic shell 20. Since the recess 30 is present, it is possible to prevent the thread of the male screw 22 from melting during the welding and to prevent the thread of the male screw 22 from deforming due to heat of the welding.

When the ground electrode 40 is inserted into the penetration hole 29 of the metallic shell 20 in such a manner that the second end portion 42 is first inserted into the penetration hole 29, the extension portion 44 enters the penetrating portion 33, and the fixing portion 43 enters the counterbore portion 31. The extension portion 44 cannot enter the penetrating portion 33 unless the extension portion 44 is oriented such that the flat surface 45 or the flat surface 47 of the extension portion 44 faces the flat surface 34 of the penetrating portion 33. Namely, when the extension portion 44 is disposed in the penetrating portion 33, the penetrating portion 33 restricts the orientation of the extension portion 44 in such a manner that the flat surface 45 (or the flat surface 47) of the extension portion 44 faces toward the rear end side in the axial direction (the upper side in section (c) of FIG. 3). The penetrating portion 33 restricts the orientation of the extension portion 44 in such a manner that the angle between the axial line O and a plane P perpendicular to the flat surface 45 (a plane containing a straight line perpendicular to the flat surface 45) becomes smaller than 90 degrees, preferably, equal to or smaller than 45 degrees, more preferably, equal to or smaller than 5 degrees.

As a result, the flat surface 45 of the extension portion 44 of the ground electrode 40 is located on the forward end side of the forward end surface 16 of the center electrode 13 in the axial direction, with the spark gap 46 intervening between the flat surface 45 and the forward end surface 16. Since discharge occurs on the flat surface 45 of the extension portion 44, consumption of the ground electrode 40 due to discharge can be reduced as compared with the case where the side surface of the ground electrode 40 is cylindrical. Therefore, it is possible to prevent expansion of the spark gap 46 at an early stage of usage.

In the case where the penetrating portion 33 restricts the orientation of the extension portion 44 in such a manner that the angle between the axial line O and the plane P perpendicular to the flat surface 45 of the extension portion 44 becomes equal to or smaller than 45 degrees, a discharge point (position where discharge occurs) becomes likely to be located on the flat surface 45 of the extension portion 44. By virtue of this, the spark consumption resistance of the ground electrode 40 can be enhanced reliably.

In the case where the penetrating portion 33 restricts the orientation of the extension portion 44 in such a manner that the angle between the axial line O and the plane P perpendicular to the flat surface 45 of the extension portion 44 becomes equal to or smaller than 5 degrees, the discharge point becomes more likely to be located on the flat surface 45 of the extension portion 44. Accordingly, the spark consumption resistance of the ground electrode 40 can be enhanced more reliably.

Since the penetrating portion 33 includes the flat surface 34 provided on the rear end side, the ground electrode 40 can be disposed in such a manner that the flat surface 45 of the extension portion 44 faces the flat surface 34 of the penetrating portion 33. Accordingly, the shape of the extension portion 44 can be made simple. Also, since the flat surface 45 of the extension portion 44 continues from the first end portion 41 to the second end portion 42 of the ground electrode 40, the shape of the extension portion 44 can be made simple. Therefore, machining of the extension portion 44 can be facilitated.

Since the extension portion 44 at the second end portion 42 of the ground electrode 40 has 2-fold symmetry about the axis C of the ground electrode 40, alignment at the time when the ground electrode 40 is disposed in the penetration hole 29 of the metallic shell 20 is easier as compared with an extension portion which is not rotational symmetry (i.e., a cross section obtained by rotating 360 degrees the original cross section of the extension portion about the axis C perfectly overlaps the original cross section).

Since the recess 30 is present, even when the length of the fixing portion 43 is greater than the depth of the counterbore portion 31, the fixing portion 43 is unlikely to project from the outer circumferential surface 28 of the metallic shell 20. In the case where the fit between the fixing portion 43 and the counterbore portion 31 is interference fit, the first end portion 41 of the ground electrode 40 is firmly fixed to the penetration hole 29 before the ground electrode 40 is welded.

The spark plug 10 is attached to the engine (not shown). After that, as a result of operation of a piston and valves of the engine, fuel gas flows from a combustion chamber through the jetting hole 26 into the sub-chamber 25 inside the metallic shell 20. The spark plug 10 produces a flame kernel at the spark gap 46 through discharge between the center electrode 13 and the ground electrode 40. When the flame kernel grows, the fuel gas within the sub-chamber 25 is ignited, whereby the fuel gas combusts. Due to expansion pressure produced as a result of the combustion, the spark plug 10 jets a flame-containing gas flow from the jetting hole 26 into the combustion chamber. As a result of the flame jet flow, the fuel gas within the combustion chamber combusts.

Since the extension portion 44 of the ground electrode 40 is located in the sub-chamber 25, the extension portion 44 is disposed in an environment in which the extension portion 44 is easily overheated and is easily consumed. However, since the spark gap 46 is formed between the flat surface 45 at the side of the extension portion 44, and the forward end surface 16 of the center electrode 13, consumption of the side surface of the ground electrode 40 caused by discharge can be reduced as compared with the case where the side surface of the ground electrode 40 is a cylindrical surface.

Since the first end portion 41 of the ground electrode 40 is held in the penetration hole 29 formed in the cylindrical tubular portion 21 of the metallic shell 20, where the male screw 22 is provided, heat of the ground electrode 40 is transferred from the cylindrical tubular portion 21 to the engine (not shown) through the male screw 22, whereby the ground electrode 40 is cooled. Therefore, it is possible to reduce consumption of the ground electrode 40 and occurrence of abnormal combustion (pre-ignition) caused by overheating of the ground electrode 40.

Figure 4:
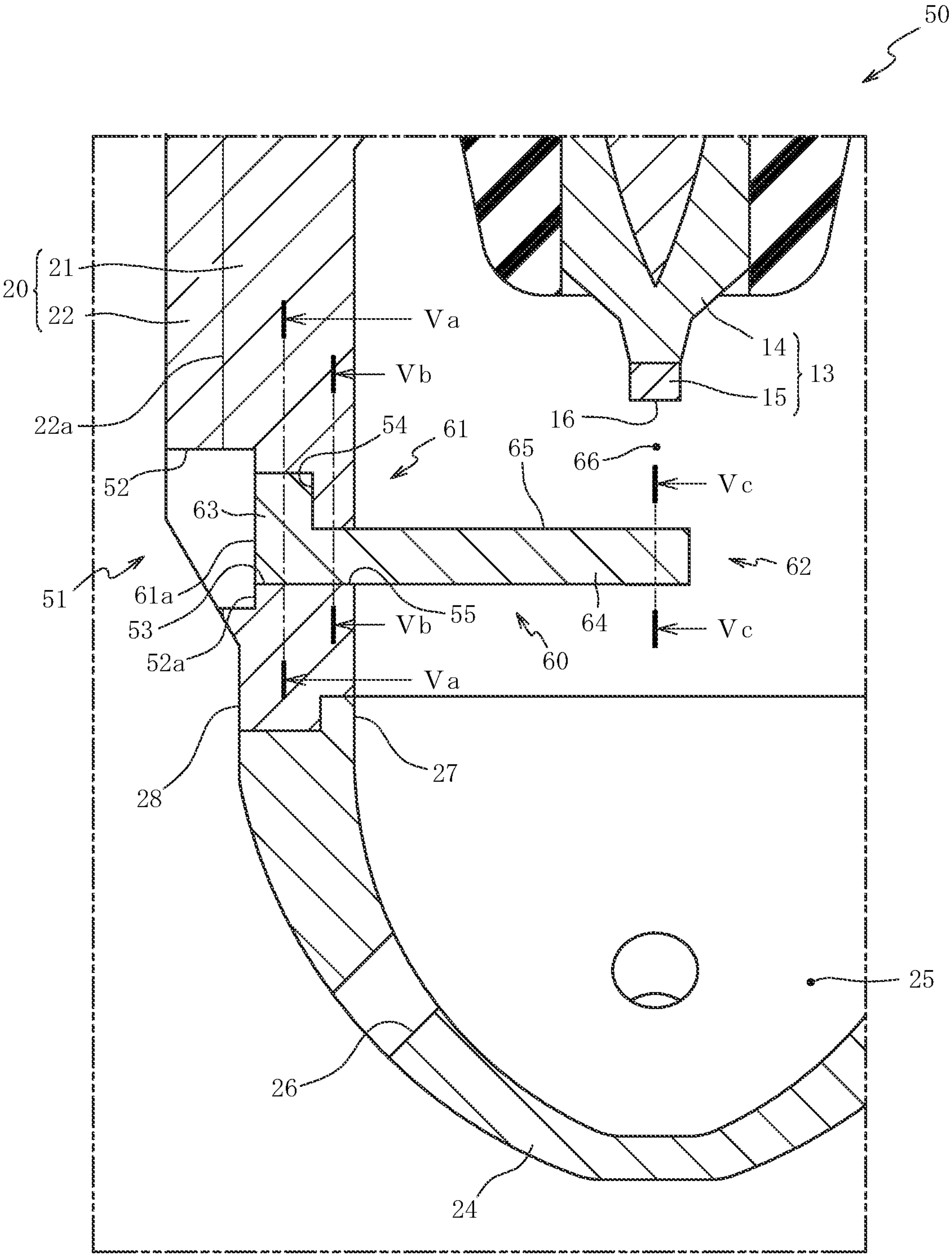
FIG. 4 is a sectional view of a spark plug in a second embodiment.

A second embodiment will be described with reference to FIGS. 4 and 5. In the first embodiment, the case where the cross section of the extension portion 44 of the ground electrode 40 is rectangular has been described. In the second embodiment, the case where the cross section of an extension portion 64 of a ground electrode 60 is semicircular will be described. Notably, portions identical with the portions described in the first embodiment are denoted by the same reference numerals, and their descriptions will not be repeated. FIG. 4 is a sectional view of a spark plug 50 in the second embodiment, the sectional view containing the axial line O. Like FIG. 2, FIG. 4 shows a portion of FIG. 1 indicated by II (this also applies to FIG. 6).

As shown in FIG. 4, in the metallic shell 20, a penetration hole 51 extending from the inner circumferential surface 27 of the metallic shell 20 to the outer circumferential surface 28 of the metallic shell 20 is formed in the cylindrical tubular portion 21 to be located at a position corresponding to the male screw 22. The penetration hole 51 has a recess 52, a counterbore portion 53, and a penetrating portion 55, which are provided in this sequence from the outer circumferential surface 28 toward the inner circumferential surface 27 of the metallic shell 20.

The recess 52 has a circular cross section. The bottom 52*a* of the recess 52 is an annular flat surface. The counterbore portion 53 communicates with the bottom 52*a* of the recess 52. The counterbore portion 53 has a diameter smaller than the diameter of the bottom 52*a* of the recess 52. The penetrating portion 55 extends from the bottom 54 of the counterbore portion 53 to the inner circumferential surface 27 of the metallic shell 20. The penetrating portion 55 has a cross-sectional area smaller than the cross-sectional area of the counterbore portion 53.

The ground electrode 60 is formed linearly and extends in a direction intersecting the axial direction (in the present embodiment, the ground electrode 60 extends approximately perpendicularly to the axial line O). The ground electrode 60 has a rod-like shape and has a first end portion 61 held in the penetration hole 51 and a second end portion 62 located on the inner side of the metallic shell 20. The first end portion 61 of the ground electrode 60 is held in the penetration hole 51 of the metallic shell 20. The second end portion 62 of the ground electrode 60 is located on the forward end side of the forward end surface 16 of the center electrode 13. The first end portion 61 is joined to the metallic shell 20 by a weld portion (not shown). An end surface 61*a* of the first end portion 61 of the ground electrode 60 and the bottom 52*a* of the recess 52 are located on the same plane.

The ground electrode 60 has a fixing portion 63 fixed to the counterbore portion 53, and an extension portion 64 extending from the fixing portion 63 beyond the inner circumferential surface 27 of the metallic shell 20. An end portion of the extension portion 64 is the same as the second end portion 62 of the ground electrode 60. The side surface of the extension portion 64 includes a flat surface 65. The flat surface 65 faces toward the rear end side in the axial direction. The flat surface 65 faces the forward end surface 16 of the center electrode 13, whereby a spark gap 66 extending in the axial direction is formed.

Figure 5:
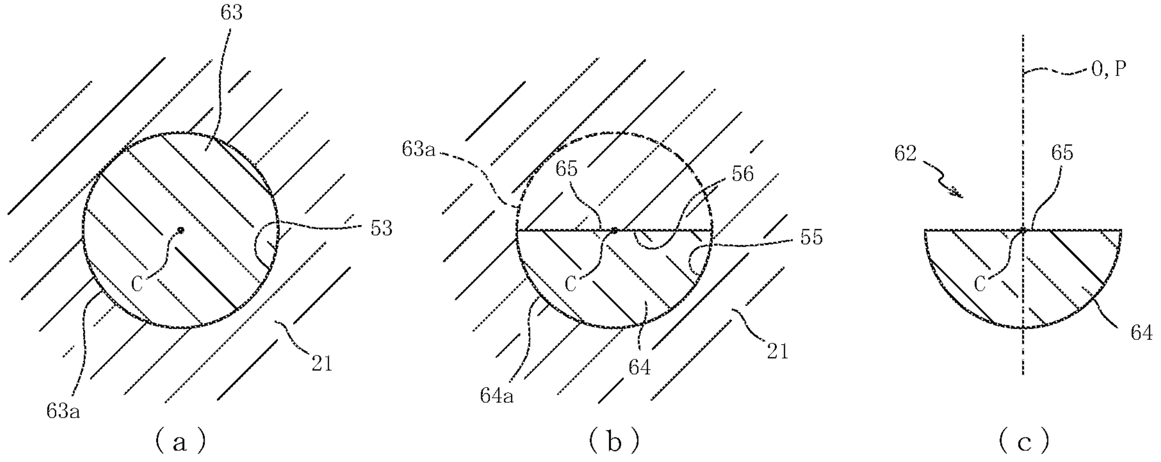
FIG. 5, Section (a) is a sectional view of the spark plug taken along line Va-Va of FIG. 4, FIG. 5, Section (b) is a sectional view of the spark plug taken along line Vb-Vb of FIG. 4, and FIG. 5, Section (c) is a sectional view of the spark plug taken along line Vc-Vc of FIG. 4.

Section (a) of FIG. 5 is a sectional view of the spark plug 50 taken along line Va-Va of FIG. 4. The counterbore portion 53 of the penetration hole 51 has a circular cross section. The fixing portion 63 of the ground electrode 60 has the shape of a circular plate (circular column) having a circular cross section, and the fixing portion 63 is fitted into the counterbore portion 53. The fixing portion 63 has rotational symmetry about the axis C which passes through the center of the cross section of the fixing portion 63 and is perpendicular to the axial line O.

Section (b) of FIG. 5 is a sectional view of the spark plug 50 taken along line Vb-Vb of FIG. 4. The extension portion 64 is partially fitted into the penetrating portion 55 of the penetration hole 51. In the present embodiment, the penetrating portion 55 has a semi-circular cross section, and a flat surface 56 is provided at the rear end. The flat surface 56 faces toward the forward end side. In the present embodiment, the flat surface 56 is perpendicular to the axial line O. The cross section of the penetrating portion 55 has line symmetry with respect to a plane containing the axis C and the axial line O.

In the present embodiment, the extension portion 64 of the ground electrode 60 has a semi-circular cross section. The flat surface 65 of the extension portion 64 faces the flat surface 56 of the penetrating portion 55. The extension portion 64 is formed such that the arc 64*a* of the outline of the cross section of the extension portion 64 coincides with the outline 63*a* of the cross section of the fixing portion 63. The flat surface 65 is located on the rear end side of the arc 64*a*. The outline 63*a* of the cross section of the fixing portion 63 refers to the outline of the cross section of a region of the fixing portion 63 where the weld portion (not shown) is not formed (a region where the outline 63*a* of the original cross section of the fixing portion 63 can be determined).

In a process of manufacturing the spark plug 50, the ground electrode 60 enters the penetration hole 51 of the metallic shell 20 in such a manner that the second end portion 62 first enters the penetration hole 51. If the extension portion 64 is not oriented such that the flat surface 65 of the extension portion 64 faces the flat surface 56 of the penetrating portion 55, the extension portion 64 cannot enter the penetrating portion 55. Namely, when the extension portion 64 is disposed in the penetrating portion 55, the penetrating portion 55 restricts the orientation of the extension portion 64 such that the flat surface 56 of the extension portion 64 faces toward the rear end side.

Section (c) of FIG. 5 is a sectional view of the spark plug 50 taken along line Vc-Vc of FIG. 4 and containing the axial line O. The size and shape of the cross section of the extension portion 64 at the second end portion 62 of the ground electrode 60 (see section (c) of FIG. 5) are identical to those of the cross section of the extension portion 64 at the first end portion 61 of the ground electrode 60 (see section (b) of FIG. 5). The penetrating portion 55 restricts the orientation of the extension portion 64 in such a manner that the angle between the axial line O and a plane P perpendicular to the flat surface 65 becomes smaller than 90 degrees, preferably, equal to or smaller than 45 degrees, more preferably, equal to or smaller than 5 degrees.

As a result, the flat surface 65 of the ground electrode 60 is located at the rear end of the extension portion 64, and the spark gap 66 is formed between the flat surface 65 and the forward end surface 16 of the center electrode 13. Consumption of the extension portion 64 due to discharge can be reduced as compared with the case where the cylindrical surface of the extension portion 64 of the ground electrode 60 faces the forward end surface 16 of the center electrode 13. Therefore, it is possible to prevent expansion of the spark gap 66 at an early stage of usage.

The extension portion 64 of the ground electrode 60 has a size determined such that the arc 64*a* of the outline of the cross section of the extension portion 64 coincides with the outline 63*a* of the cross section of the fixing portion 63. Therefore, it is possible to secure the volume of the extension portion 64 at the second end portion 62 while providing the flat surface 65 on the extension portion 64. Accordingly, consumption per unit volume of the extension portion 64 caused by discharge can be reduced. Since the flat surface 65 of the extension portion 64 is set to contain the axis C, the width (dimension in the lateral direction in section (c) of FIG. 5) of the flat surface 65 can be maximized.

Figure 6:
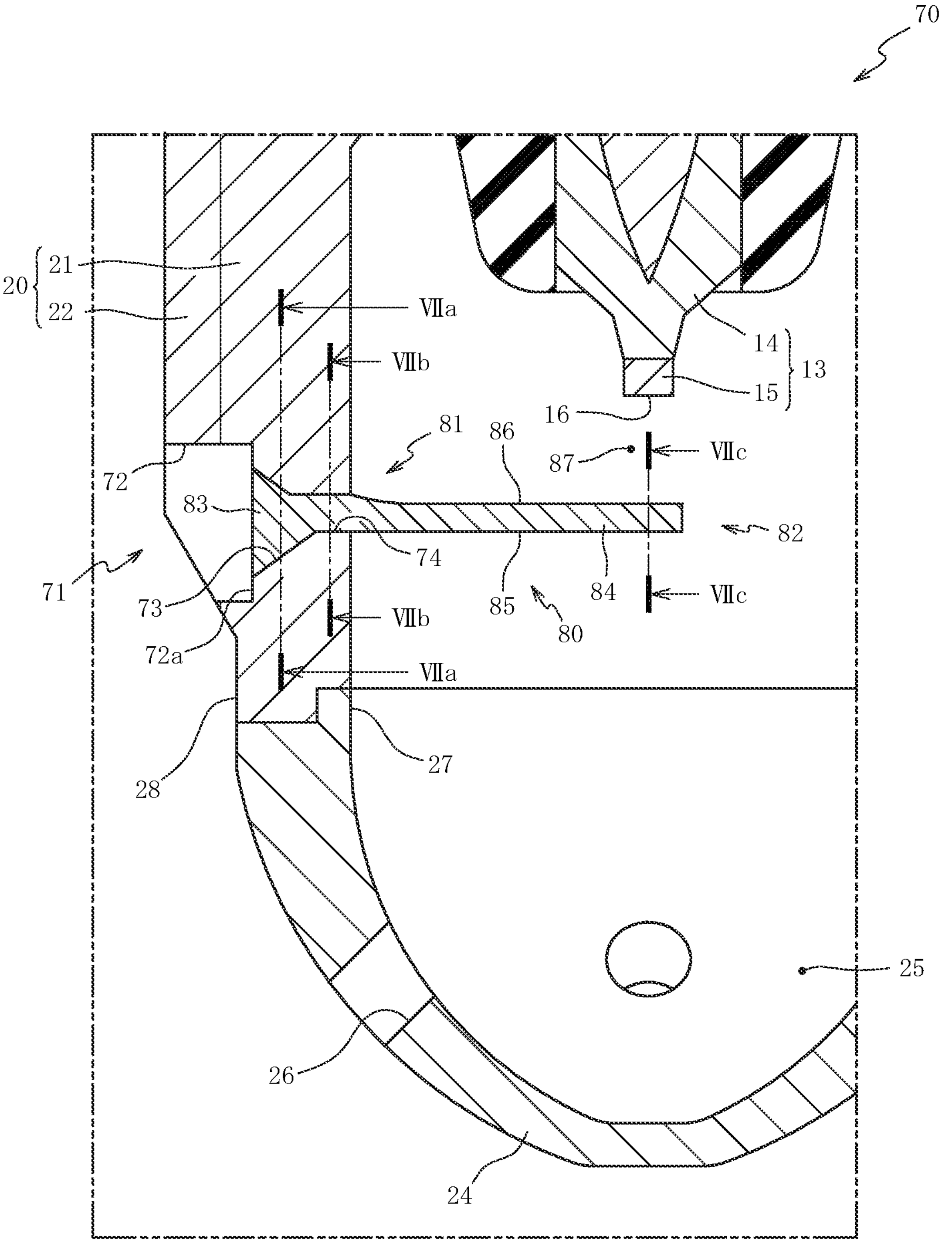
FIG. 6 is a sectional view of a spark plug in a third embodiment.

A third embodiment will be described with reference to FIGS. 6 and 7. In the first and second embodiments, the case where the flat surface 45 (65) of the extension portion 44 (64) continues from the first end portion 41 (61) to the second end portion 42 (62) of the ground electrode 40 (60). In the third embodiment, there will be described the case where a flat surface 86 provided on a second end portion 82 of a ground electrode 80 is interrupted at an extension portion 84 and does not extend to a first end portion 81. Notably, portions identical with the portions described in the first embodiment are denoted by the same reference numerals, and their descriptions will not be repeated. FIG. 6 is a sectional view of a spark plug 70 in the third embodiment, the sectional view containing the axial line O.

As shown in FIG. 6, in the metallic shell 20, a penetration hole 71 extending from the inner circumferential surface 27 of the metallic shell 20 to the outer circumferential surface 28 of the metallic shell 20 is formed in the cylindrical tubular portion 21 to be located at a position corresponding to the male screw 22. The penetration hole 71 has a recess 72, a counterbore portion 73, and a penetrating portion 74, which are provided in this sequence from the outer circumferential surface 28 toward the inner circumferential surface 27 of the metallic shell 20.

The recess 72 has a circular cross section. The bottom 72*a* of the recess 72 is an annular flat surface. The counterbore portion 73 is a conical surface connected to the bottom 72*a* of the recess 72. The counterbore portion 73 has a diameter smaller than the diameter of the bottom 72*a* of the recess 72. The penetrating portion 74 extends from the counterbore portion 73 to the inner circumferential surface 27 of the metallic shell 20. The penetrating portion 74 has a cross-sectional area smaller than the cross-sectional area of the counterbore portion 73.

The ground electrode 80 is formed linearly and extends in a direction intersecting the axial direction (in the present embodiment, the ground electrode 80 extends approximately perpendicularly to the axial line O). The ground electrode 80 has a rod-like shape and has a first end portion 81 held in the penetration hole 71 and a second end portion 82 located on the inner side of the metallic shell 20. The first end portion 81 of the ground electrode 80 is held in the penetration hole 71 of the metallic shell 20. The second end portion 82 of the ground electrode 80 is located on the forward end side of the forward end surface 16 of the center electrode 13. The first end portion 81 is joined to the metallic shell 20 by a weld portion (not shown).

The ground electrode 80 has a fixing portion 83 fixed to the counterbore portion 73, and an extension portion 84 extending from the fixing portion 83 beyond the inner circumferential surface 27 of the metallic shell 20. An end portion of the extension portion 84 is the same as the second end portion 82 of the ground electrode 80. The side surface of the extension portion 84 includes a flat surface 86. The flat surface 86 faces toward the rear end side in the axial direction. The flat surface 86 faces the forward end surface 16 of the center electrode 13, whereby a spark gap 87 extending in the axial direction is formed.

Figure 7:
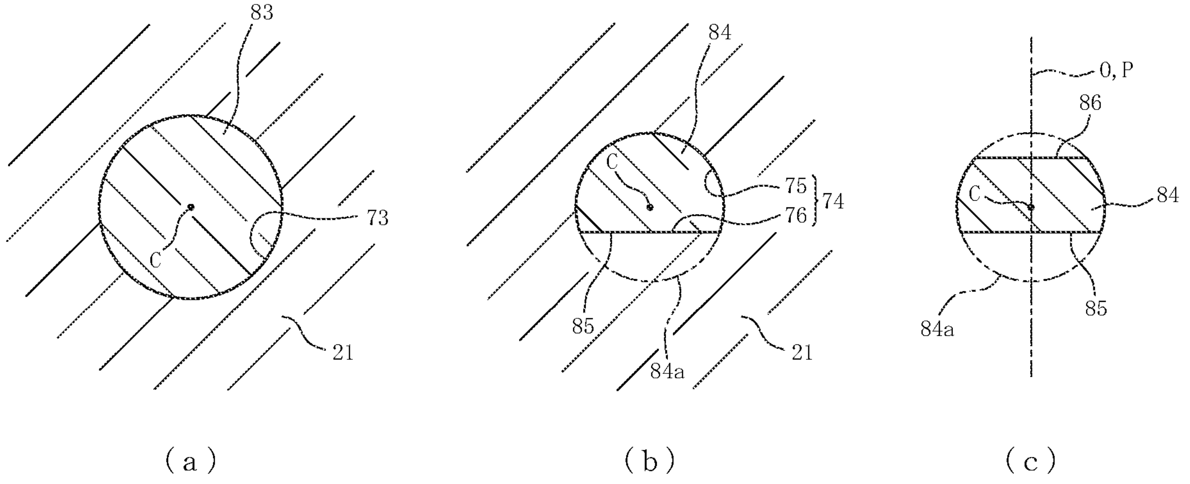
FIG. 7, Section (a) is a sectional view of the spark plug taken along line VIIa-VIIa of FIG. 6, FIG. 7, Section (b) is a sectional view of the spark plug taken along line VIIb-VIIb of FIG. 6, and FIG. 7, Section (c) is a sectional view of the spark plug taken along line VIIc-VIIc of FIG. 6.

Section (a) of FIG. 7 is a sectional view of the spark plug 70 taken along line VIIa-VIIa of FIG. 6. The counterbore portion 73 of the penetration hole 71 has a circular cross section. The fixing portion 83 of the ground electrode 80 has the shape of a circular plate (circular cone) having a circular cross section, and the fixing portion 83 is fitted into the counterbore portion 73. The fixing portion 83 has rotational symmetry about the axis C which passes through the center of the cross section of the fixing portion 83 and is perpendicular to the axial line O.

Section (b) of FIG. 7 is a sectional view of the spark plug 70 taken along line VIIb-VIIb of FIG. 6. The extension portion 84 is partially fitted into the penetrating portion 74 of the penetration hole 71. In the present embodiment, the penetrating portion 74 is composed of a semi-cylindrical surface 75 whose cross section is a major arc, and a flat surface 76 connecting together opposite side edges of the semi-cylindrical surface 75. The flat surface 76 is provided at the forward end of the penetrating portion 74. The flat surface 76 faces toward the rear end side. In the present embodiment, the flat surface 76 is perpendicular to the axial line O. The cross section of the penetrating portion 74 has line symmetry with respect to the plane containing the axis C and the axial line O.

One end portion of the extension portion 84 of the ground electrode 80 has a shape obtained by halving a circular column 84*a* and is fitted into the penetrating portion 74. The extension portion 84 has the flat surface 85 facing toward the forward end side. The flat surface 85 of the extension portion 84 faces the flat surface 76 of the penetrating portion 74.

Section (c) of FIG. 7 is a sectional view of the spark plug 70 taken along line VIIc-VIIc of FIG. 6, the sectional view containing the axial line O and being perpendicular to the axis C. The extension portion 84 has the flat surface 86 which is provided at the second end portion 82 of the ground electrode 80 and intersects the axial line O. The flat surface 86 faces toward the rear end side and is provided on the side opposite the flat surface 85. The length of the flat surface 86 along the axis C is shorter than the length of the flat surface 85 along the axis C. The length of the flat surface 86 (the length of the chord of a corresponding portion (arc) of the circular column 84*a*) in a cross section perpendicular to the axis C is shorter than the length of the flat surface 85 (the length of the chord of a corresponding portion (arc) of the circular column 84*a*) in the cross section perpendicular to the axis C.

In a process of manufacturing the spark plug 70, the ground electrode 80 enters the penetration hole 71 of the metallic shell 20 in such a manner that the second end portion 82 first enters the penetration hole 71. If the extension portion 84 is not oriented such that the flat surface 85 of the extension portion 84 faces the flat surface 76 of the penetrating portion 74, the extension portion 84 cannot enter the penetrating portion 74. Namely, when the extension portion 84 is disposed in the penetrating portion 74, the penetrating portion 74 restricts the orientation of the extension portion 84 such that the flat surface 86 of the extension portion 84 faces toward the rear end side. The penetrating portion 74 restricts the orientation of the extension portion 84 in such a manner that the angle between the axial line O and a plane P perpendicular to the flat surface 86 becomes smaller than 90 degrees, preferably, equal to or smaller than 45 degrees, more preferably, equal to or smaller than 5 degrees.

As a result, the spark gap 87 is formed between the flat surface 86 of the ground electrode 80 and the forward end surface 16 of the center electrode 13. Therefore, consumption of the extension portion 84 due to discharge can be reduced as compared with the case where the cylindrical surface of the extension portion 84 of the ground electrode 80 faces the forward end surface 16 of the center electrode 13. Therefore, it is possible to prevent expansion of the spark gap 87 at an early stage of usage.

The present invention has been described on the basis of embodiments. However, it is easily inferred that the present invention is not limited to the above-described embodiments and various improvements and modifications can be made without departing from the spirit of the invention. For example, the shapes, etc. of the bottom portion 24 of the metallic shell 20 and the ground electrodes 40, 60, and 80 can be set appropriately.

In the embodiments, the case where the forward end of the metallic shell 20 is closed by the bottom portion 24 has been described. However, the structure of the metallic shell 20 is not limited to such a structure. Of course, the metallic shell 20 can have a structure in which the bottom portion 24 is omitted, so that the sub-chamber 25 is not provided. In this case as well, a flame kernel is produced at the spark gap 46 (66, 87) as a result of discharge between the center electrode 13 and the ground electrode 40 (60, 80). When the flame kernel grows, a fuel gas within the combustion chamber burns. Since the spark gap 46 (66, 87) is formed between the forward end surface 16 of the center electrode 13 and the flat surface 45 (65, 86) of the ground electrode 40 (60, 80), consumption of the extension portion 44 (64, 84) due to discharge can be reduced as compared with the case where the spark gap is provided on the cylindrical surface of the ground electrode 40 (60, 80).

In the embodiments, the center electrode 13 including the base member 14 and the discharge member 15 connected thereto has been described. However, the structure of the center electrode 13 is not limited thereto. Of course, the discharge member 15 can be omitted. In the case where the discharge member 15 is omitted, the forward end surface of the center electrode 13 refers to the forward end surface of the base member 14.

In the embodiments, there has been described case where the penetration hole 29 (51, 71) which holds the first end portion 41 (61, 81) of the ground electrode 40 (60, 80) is provided in the metallic shell 20 to be located at a position corresponding to the male screw 22. However, the position of the penetration hole 29 (51, 71) is not limited thereto. Of course, the penetration hole which holds the first end portion of the ground electrode can be provided in, for example, a region of the cylindrical tubular portion 21, which region is located on the forward end side of the male screw 22. Also, in the case where the forward end of the metallic shell 20 is closed by the bottom portion 24, of course, the penetration hole which holds the first end portion of the ground electrode can be provided in the bottom portion 24.

In the embodiments, there has been described the case where the penetrating portion 33 (55, 74) restricts the orientation of the extension portion 44 (64, 84) of the ground electrode 40 (60, 80) (the angle of the extension portion about the axis C), by utilizing the engagement between the flat surface 34 (56, 76) provided at the penetrating portion 33 (55, 74) and the flat surface 45 (65, 85) provided at the extension portion 44 (64, 84), in such a manner that the flat surface 45 (65, 86) faces toward the rear end side. However, the manner in which the penetrating portion 33 (55, 74) restricts the orientation of the extension portion 44 (64, 84) is not limited thereto. Of course, the penetrating portion can restrict the orientation of the extension portion 44 (64, 84) of the ground electrode 40 (60, 80) by unitizing a recess and a protrusion which are provided at the penetrating portion and the extension portion, respectively, and which engage with each other.

In the first embodiment, the extension portion 44 having a rectangular cross section has been described, and in the second embodiment, the extension portion 64 having a semi-circular cross section has been described. However, the cross sectional shapes of the extension portions are not limited thereto. Of course, it is possible to employ an extension portion having a different cross sectional shape so long as the flat surface 45 (65) for forming the spark gap in cooperation with the forward end surface 16 of the center electrode 13 can be formed on the side surface of the extension portion 44 (64). An example of the different cross sectional shape of the extension portion is a polygonal shape such as a triangular shape or a pentagonal shape. Of course, it is possible to round or chamfer the edge of the flat surface 45 (65, 86) of the extension portion 44 (64, 84).

In the second embodiment, there has been described the case where the extension portion 64 of the ground electrode 60 has a semi-circular cross section, and the flat surface 65 of the extension portion 64 contains the center of the outline 63*a* of the cross section of the fixing portion 63. However, the cross sectional shape of the extension portion 64 is not limited thereto. Of course, it is possible to set the cross sectional shape of the extension portion 64 such that the arc 64*a* of the outline of the cross section of the extension portion 64 becomes a minor arc or a major arc.

In the first and second embodiments, the case where the fixing portion 43 (63) of the ground electrode 40 (60) has a circular columnar shape has been described, and in the third embodiment, the case where the fixing portion 83 of the ground electrode 80 has a conical shape has been described. However, the shapes of the fixing portions are not limited thereto. Of course, it is possible to form the fixing portions 43 and 63 of the ground electrodes 40 and 60 into a conical shape and to form the fixing portion 83 of the ground electrode 80 into a circular columnar shape.

In the embodiments, the case where the bottom portion 24 of the metallic shell 20 is welded to the cylindrical tubular portion 21 has been described. However, the manner of joining the bottom portion 24 of the metallic shell 20 to the cylindrical tubular portion 21 is not limited thereto. Of course, it is possible to prepare a tubular member having a closed forward end and connect the tubular member to the cylindrical tubular portion 21, instead of welding the bottom portion 24 to the cylindrical tubular portion 21, thereby forming the sub-chamber 25. For example, a female screw which is engaged with the male screw 22 is formed on the inner circumferential surface of the tubular member. A male screw which is engaged with a threaded hole of the engine (not shown) is formed on the outer circumferential surface of the tubular member. As a result of engagement of the female screw of the tubular member with the male screw 22, the forward end of the metallic shell 20 is closed. The jetting holes 26 are formed in the tubular member.

Notably, the means for connecting the tubular member to the cylindrical tubular portion 21 such that the metallic shell 20 becomes a bottomed tubular body is not limited to engaging the female screw of the inner circumferential surface of the tubular member with the male screw 22. Of cause, it is possible to employ a different means so as to connect the tubular member to the cylindrical tubular portion 21. An example of the different means is joining the tubular member to the bearing portion 23 by means of, for example, welding. The tubular member may be formed of a metallic material such as a nickel-based alloy or stainless steel, or a ceramic material such as silicon nitride.

DESCRIPTION OF REFERENCE NUMERALS AND SYMBOLS

10, 50, 70: spark plug
13: center electrode
16: forward end surface of center electrode
20: metallic shell
26: jetting hole
27: inner circumferential surface of metallic shell
29, 51, 71: penetration hole
30, 52, 72: recess
31, 53, 73: counterbore portion
33, 55, 74: penetrating portion
34, 56: flat surface
40, 60, 80: ground electrode
41, 61, 81: first end portion
42, 62, 82: second end portion
43, 63, 83: fixing portion
44, 64, 84: extension portion
45, 65, 86: flat surface
46, 66, 87: spark gap
O: axial line
P: perpendicular plane

What is claimed is:

1. A spark plug comprising:

a center electrode extending in a direction of an axial line;

a tubular metallic shell which holds the center electrode in an insulated condition and which has a penetration hole penetrating the metallic shell in a thickness direction; and a ground electrode which extends in a direction intersecting the direction of the axial line and which has a first end portion held in the penetration hole, and a second end portion located on a forward end side of the center electrode in the direction of the axial line such that a spark gap is provided between the second end portion and a forward end surface of the center electrode, wherein the penetration hole includes a circular counterbore portion provided on an outer circumferential side of the metallic shell, and a penetrating portion extending from the counterbore portion to an inner circumferential surface of the metallic shell;

the ground electrode includes a circular plate-shaped fixing portion which is fixed to the counterbore portion, and an extension portion extending from one surface of the fixing portion to a position which faces the forward end surface of the center electrode in the direction of the axial line;

a flat surface which faces the forward end surface of the center electrode in the direction of the axial line is provided on a side surface of the extension portion; and the penetrating portion restricts the extension portion such that the flat surface of the extension portion faces toward a rear end side in the direction of the axial line.

2. The spark plug according to claim 1, wherein the penetrating portion restricts an orientation of the extension portion such that an angle between the axial line and a plane perpendicular to the flat surface becomes smaller than 90 degrees.

3. The spark plug according to claim 1, wherein the penetrating portion restricts an orientation of the extension portion such that an angle between the axial line and a plane perpendicular to the flat surface becomes equal to or smaller than 45 degrees.

4. The spark plug according to claim 1, wherein the penetrating portion restricts an orientation of the extension portion such that an angle between the axial line and a plane perpendicular to the flat surface becomes equal to or smaller than 5 degrees.

5. The spark plug according to claim 1, wherein the penetrating portion includes a flat surface provided on a rear end side of the penetrating portion.

6. The spark plug according to claim 1, wherein the penetration hole has a recess which is larger in diameter than the counterbore portion and is located on the outer circumferential side of the metallic shell in relation to the counterbore portion.

7. The spark plug according to claim 1, wherein the metallic shell is a tubular body having a closed bottom on a forward end side in the direction of the axial line, and has a jetting hole which differs from the penetration hole and penetrates the metallic shell in the thickness direction.

* * * * *